March 28, 1933. W. H. CARRIER 1,903,210
SEALING AND THRUST BALANCING MEANS
Filed Feb. 28, 1929 2 Sheets-Sheet 1

INVENTOR.
Willis H. Carrier
By Parker & Brochurst
ATTORNEYS.

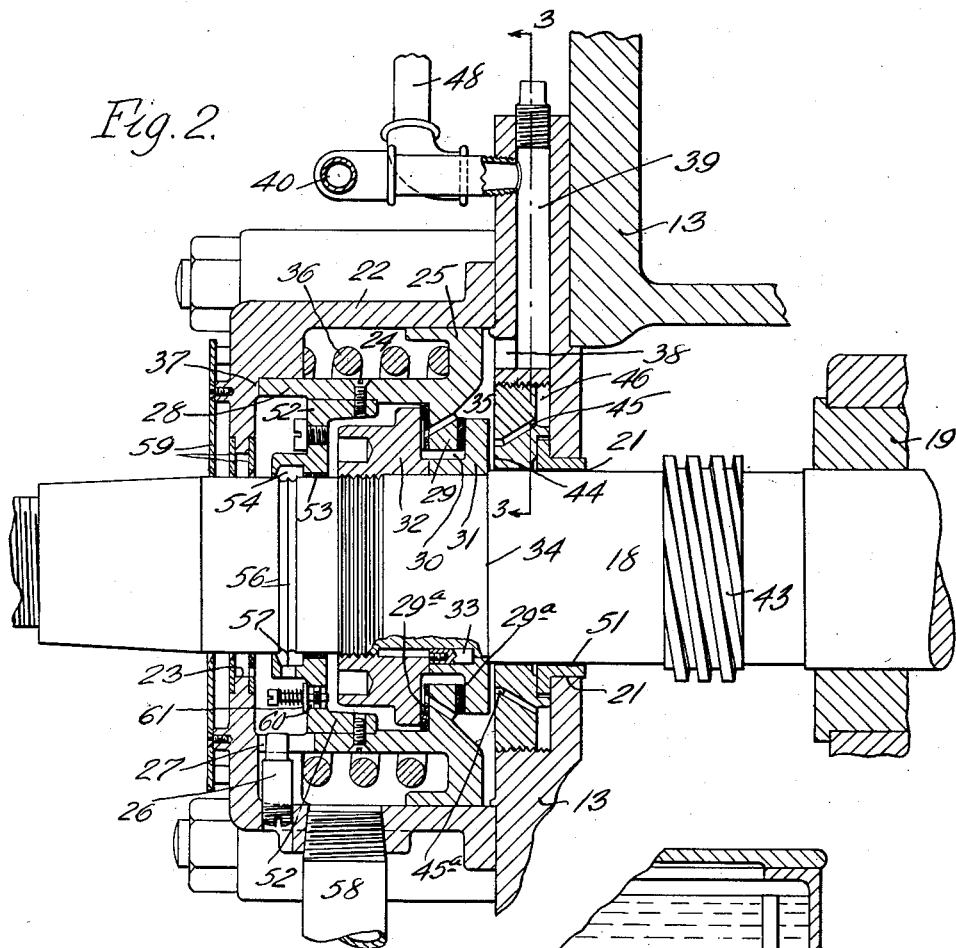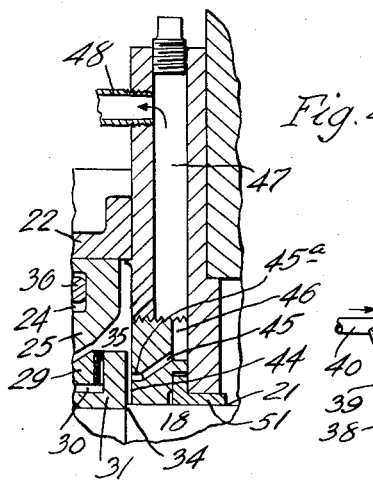

Patented Mar. 28, 1933

1,903,210

UNITED STATES PATENT OFFICE

WILLIS H. CARRIER, OF ESSEX FELLS, NEW JERSEY, ASSIGNOR TO CARRIER ENGINEERING CORPORATION, OF NEWARK, NEW JERSEY

SEALING AND THRUST BALANCING MEANS

Application filed February 28, 1929. Serial No. 343,398.

This invention relates to shaft sealing and thrust balancing means and particularly to means applicable to centrifugal vacuum pumps and elastic fluid compressors for sealing the opening through which the drive shaft extends out of the compressor casing or connected casing to prevent leakage through said opening, and for yieldingly resisting or balancing the thrust of said shaft.

One object of the invention is to provide an efficient and reliable sealing means of novel construction.

Another object of the invention is to provide simple and efficient sealing and thrust balancing or opposing means.

Other objects of the invention are to provide a practical and reliable device of improved and simple construction, which provides a substantially frictionless liquid seal for the shaft opening when the shaft is running, and includes a sealing or closure member which is held against a cooperating seat to prevent leakage through the shaft opening when the shaft is not running or is stationary; also to provide an efficient combined sealing and thrust balancing device for the shafts of compressors and the like, which comprises a member which is held against a cooperating seat to seal the shaft opening when the compressor is not running and is moved and held off of its seat by fluid pressure when the compressor is running and yieldingly opposes the thrust on the shaft, and in which a substantially frictionless fluid seal for the shaft opening is provided when the compressor is running; and also to provide a device of the character mentioned which has other features of improvement and advantage hereinafter described and set forth in the claims.

In the accompanying drawings:

Fig. 2 is a sectional elevation on an enlarged scale of the sealing and thrust balancing device.

Fig. 3 is a fragmentary, sectional elevation thereof on a reduced scale on line 3—3, Fig. 2.

Fig. 4 is a sectional elevation thereof on line 4—4, Fig. 3, on the same scale as Fig. 2.

Figure 1:
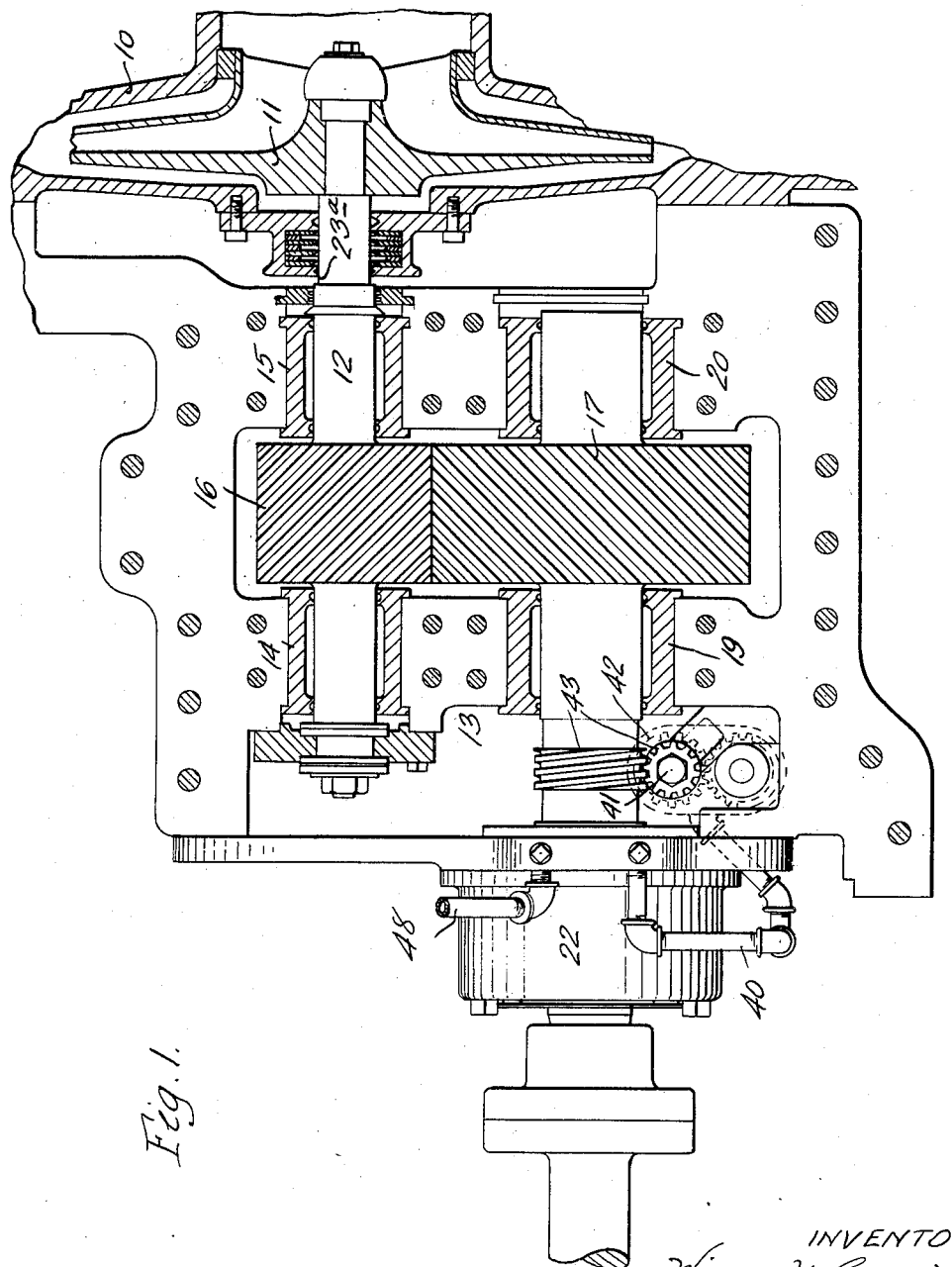
Fig. 1 is a fragmentary, sectional plan view of a centrifugal compressor of the gear driven type provided with a sealing and thrust balancing device embodying my invention applied to the low speed, drive shaft of the compressor.

Referring to the drawings, 10 represents the compressor casing, 11 the compressor rotor and 12 the rotor shaft which extends from the rotor into a gear housing or chamber 13 in which the rotor shaft is journalled in suitable bearings 14 and 15 and is connected by intermeshing gear wheels 16 and 17 to a low speed drive shaft 18 which is journalled in suitable bearings 19 and 20 in the gear housing and extends out of the housing through a shaft opening 21 for connection to the driving motor or device.

While, as illustrated in the drawings, the sealing device forming the subject of this invention, is applied to a gear driven compressor, and for the purpose of sealing the opening 21 through which the low speed shaft extends out of the gear housing located at the high pressure end of the compressor, it will be understood that the invention is not limited to such application, but is also applicable to the shafts of direct driven compressors and to other purposes.

The sealing and thrust balancing device may be housed or enclosed in a casing 22 bolted or otherwise rigidly secured to the end of the gear casing 13 so as to provide a gas tight joint between these parts around the shaft opening 21, and the shaft 18 extends through the casing 22 and out through an opening 23 in the outer end thereof.

The gear chamber 13 is a tight chamber which communicates with the rotor chamber of the compressor by the opening 23a through which the rotor shaft passes from the latter to the former chamber, so that in effect the compressor rotor, gearing and bearings are all housed in portions of a common enclosure or chamber.

In the seal casing 22 is formed a sealing or piston chamber 24, preferably cylindrical, which surrounds the shaft 18 and in which a piston or pressure actuated device 25 is adapted to move axially of the shaft 18, but is preferably held from rotation by suitable means, such for example, as a stud or pin 26 secured to the casing 22 and projecting into a slot 27 in the annular body 28 of the piston. As shown the piston is provided with an inwardly projecting annular flange 29 which extends into an annular groove 30 formed in a combined sealing ring and thrust member 31—32 which surrounds the shaft 18 and is preferably secured to the shaft, so as to rotate therewith and move axially with the shaft in any movement of the latter, due to thrust on the shaft. The sealing and thrust member 31—32 is preferably composed of separate rings or parts 31—32 to facilitate assembly thereof with the annular flange 29 of the piston, but the two rings 31—32 of the sealing and thrust member are interlocked or rigidly connected with each other so as to act as a single part or member. These parts can be rigidly secured to the shaft in any suitable manner, for instance, as shown, the sealing ring 31 is keyed to the shaft so as to turn therewith by a suitable key 33 and the other or thrust ring 32 is screwed on a threaded portion of the shaft and clamps the sealing ring 31 between the thrust ring 32 and a shoulder 34 on the shaft.

The sealing and thrust member 31—32 rotates in the sealing chamber 24 and is adapted to have a slight endwise or axial movement in the sealing chamber and when the piston 25 is moved in the sealing chamber 24, it is adapted to move the sealing and thrust member 31—32 with it by reason of the engagement of the piston flange 29 with the opposite faces of the groove 30 in the sealing and thrust member, and since, as explained, the sealing and thrust member is preferably rigid with the shaft, the piston 25 is adapted to oppose axial or thrust movements of the shaft in opposite directions. The thrust is continuous in one direction and momentary in the opposite direction when the speed of the driven unit exceeds that of the driver.

The opposite sides of the piston flange 29 are preferably faced with packing rings 29a of anti-friction or other suitable material making a close running fit with the opposing faces of the groove 30.

A suitable sealing fluid, preferably lubricating oil, is supplied under pressure to the inner end 35 of the sealing chamber 24 between the large inner end of the piston and the adjacent end wall of the sealing chamber and tends to move the piston outwardly against the action of a suitable spring 36, which preferably surrounds the piston between the enlarged inner end thereof and the outer end of the piston chamber, until the piston is arrested by a suitable stop, as for instance, by engagement of the outer end of the piston with a shoulder 37 on the outer end wall of the sealing chamber. Sealing fluid may be supplied to the space 35 at the inner end of the piston chamber through suitable connections, such as a port 38 and passage 39 connecting with a pipe 40 that leads to a suitable source of fluid under pressure. Preferably the pipe 40 connects with an oil supply pump which is geared to the drive shaft 18 or is otherwise operatively connected with the compressor so that the pump will deliver the oil under pressure to the sealing chamber when the compressor is running. For instance, the shaft 41 of the oil pump 42 (see Fig. 1) may be driven by gearing 43 connecting the pump shaft to the drive shaft 18.

When the compressor is running, the oil delivered under pressure by the pump to the inner end of the sealing chamber will overcome the pressure of the spring 36 and move the piston 25 and the thrust and sealing member 31—32 outwardly and hold the sealing ring out of contact with an opposing seat 44 preferably formed by a stationary ring at the inner end of the sealing chamber.

The fluid pressure and spring 36 acting in opposition on the piston, yieldingly resist thrust in opposite directions on the shaft 18, but the spring can automatically close the sealing member 31 against the seat 44 only when the compressor is shut down.

Under these conditions the sealing liquid is adapted to enter the space between the sealing ring 31 and its seat 44 and pass through suitable connections, such as ports 45 in the seat, an annular groove or chamber 46 in the end wall of the sealing chamber, a passage 47 and connecting pipe 48 into a suitable reservoir 49, from which the oil can discharge through an overflow pipe 50 to bearings or other parts requiring lubrication. An annular groove 45a is preferably formed in the face of the seat 44 connecting the ports 45 so as to form a continuous ring of oil around the shaft opening between the sealing member and the seat when these parts are in contact, as hereinafter explained.

Some of the oil or sealing liquid will escape from the sealing chamber through the shaft opening 21 into the gear casing 13 and may be there utilized for lubricating the gears, bearings or other parts therein.

When the compressor stops, the oil pump will stop also. Therefore, the pressure on the liquid to the sealing chamber will drop and the spring 36 will then move the piston 25 and the thrust and sealing member and the shaft to which the latter are connected so as to press the sealing ring 31 against the seat 44 and thus form a mechanical or valve closure to prevent leakage of air or gas to or from the gear casing or compressor through the opening 21. During the time that the compressor is not running, sealing liquid will be delivered from the reservoir 49 through the pipe 48 and connecting passages and ports 45 to the groove 45a in the seat 44 and will maintain a ring or film of the sealing liquid between the opposing faces of the seat and sealing ring which will assist the sealing ring in maintaining a gas tight joint to prevent leakage through the shaft opening 21. By locating the reservoir 49 at an elevation higher than the sealing chamber, a pressure above atmospheric is maintained on the seal when the machine is not running.

In order to reduce the escape or leakage of sealing liquid from the sealing chamber, the shaft opening 21 is restricted by means of a ring 51 or packing of any suitable construction adapted to obstruct the flow of the sealing liquid through said opening. Also the escape of the liquid in the opposite direction through the hollow piston around the sealing and thrust member is obstructed preferably by a ring 52 secured within the annular body of the piston 25 and closely surrounding the shaft 18 between the outer end of the thrust ring 32 and the outer end of the seal casing 22. The inner edge of this ring may be faced with a packing gasket 53 of suitable material having a close running fit with the shaft 18, and the inner edge of the ring may be provided with a circumferential groove 54 encircling the shaft, which may be provided within this groove 54 with circumferential grooves or ribs 56 adapted to throw the oil off of the shaft into the groove 54 from which the oil can drain through a hole 57 in the lower portion of the ring 52 into the bottom of the sealing chamber, from which it can escape through a drain pipe 58 adapted to return the oil ultimately to the oil pump or supply. A labyrinth or other suitable packing 59 surrounding the shaft at the outer end of the seal casing 22 restricts leakage through the shaft opening 23.

The oil or sealing liquid which escapes past the internal flange 29 of the piston through the groove 30 in the sealing and thrust member serves to lubricate the opposing faces of these parts and can escape from the enclosed space within the piston between the restricting ring 52 and thrust collar 32 through an opening 60 in the piston ring 52, controlled by a spring-pressed or other suitable valve 61 adapted to be opened outwardly by the oil pressure and permit the escape of oil from the interior of the piston into the sealing chamber at the outer end of the piston. The valve spring is very light, only strong enough to keep the space within the piston around the sealing ring 32 approximately full of oil and exclude air from mixing with the oil.

An important advantage results in a compressor of the overhung type from the described arrangement in which the compressor rotor or impeller and its drive gearing and bearings are enclosed in the same space, or adjacent communicating portions of a common chamber or enclosure, where all may be under substantially the same vacuum or pressure. It would be practically impossible to make the unit so compact and insure proper performance and support the impeller overhung from a bearing at one end of the impeller without this arrangement, in which the seal for the shaft opening is provided at the outer end of the gear or bearing enclosure, that is at the outer side of the gear or bearing.

By the construction of the apparatus as above described, and illustrated in the drawings, the seal and thrust piston are combined in a single unit at one and the same end of the shaft. The piston actually opposes the normal thrust on the shaft and also takes care of the thrust of the spring 36. It has, however, a definite travel, and the running clearance between the sealing ring and its seat is large enough to avoid any damage while the machine is in operation.

The oil supply to the inner end of the sealing chamber is under a pressure, depending on the amount of thrust that must be opposed by the piston. When this oil is released, by being forced through the space between the closely opposed faces of the piston flange 29, and the sealing and thrust member 31—32, it is released at high velocity. This velocity has a tendency to create foam and trap air and release vapors when the compressor is employed, for instance, for compressing refrigerant vapors in a refrigerating machine. The ring portion 52 of the piston is therefore closely fitted around the shaft 18 and acts as a sort of shroud, to collect this oil, excluding air, and release the oil through the valved relief opening 60 as a solid liquid stream of low velocity. Without this provision, the amount of foam and escape of oil along the shaft, entrainment of air into the system and loss of refrigerant vapors would be so considerable as to be an objection.

The piston 25 is adapted to take the thrust in both directions. The normal thrust, however, is to the right in Figs. 1 and 2. The thrust to the left is only temporary, and occurs when the compressor or gear speed is greater than the speed of the driving unit, such as occurs during surges, or when the machine is shut down.

Another advantage of the described construction is that the oil pressure builds up rapidly and quickly forces the piston and sealing ring into running position, minimizing the possibility of the sealing faces becoming worn during the starting periods. It will be understood that the sealing ring 31 bears firmly against the seat 44 when the machine is not running. This contact continues for a few revolutions when the machine is first started up, but it will not do any damage, since the opposing faces are not in contact long enough to remove or destroy the oil film that is normally present between them.

It will be noted that the total discharge of the oil pump is applied to the piston 25 and must move the piston into running position before any of the pump oil can escape through other outlets. This insures the quick operating of the seal in starting up. The oil goes first to the piston, then through the seal to the oil reservoir 49 from which it goes to the bearings.

I claim as my invention:

1. The combination with a rotary shaft and a casing having a shaft opening through which said shaft extends, of means for sealing said shaft opening comprising a sealing member rotatable with said shaft, a sealing chamber in which said sealing member rotates and at one end of which is an opposing seat for said sealing member, an annular piston movable axially in said sealing chamber and engaging said sealing member, said piston fitting closely in said sealing chamber and having a portion closely surrounding said shaft at the opposite end of said sealing member from said seat, and means for admitting to the sealing chamber liquid under pressure which acts on said piston to move and hold said sealing member out of contact with said seat and maintains liquid under pressure in said sealing chamber and in the interior of said piston to provide a seal for said shaft opening.

2. The combination with a rotary shaft and a casing having a shaft opening through which said shaft extends, of means for sealing said shaft opening comprising a sealing member rotatable with said shaft, a sealing chamber in which said sealing member rotates and at one end of which is an opposing seat for said sealing member, an annular piston movable axially in said sealing chamber and engaging said sealing member, said piston fitting closely in said sealing chamber and having a portion closely surrounding said shaft at the opposite end of said sealing member from said seat, means for admitting to the sealing chamber liquid under pressure which acts on said piston to move and hold said sealing member out of contact with said seat and maintains liquid under pressure in said sealing chamber and in the interior of said piston to provide a seal for said shaft opening, and a relief device which is actuated by the liquid pressure in said sealing chamber to permit the escape of liquid from the interior of said piston.

3. The combination with a rotary shaft and a casing having a shaft opening through which said shaft extends, of means for sealing said shaft opening comprising a sealing member and an opposing seat which are adapted to be pressed together to prevent leakage through said shaft opening, a chamber in which said sealing member is located, a pressure actuated device in said chamber arranged to act by its movement to separate said sealing member and said seat, means for supplying to said chamber a lubricant under pressure which actuates said device to separate and hold said sealing member and seat out of contact in opposition to pressure tending to cause contact thereof and forms a liquid seal for said shaft opening, and a passage which is placed in communication with said chamber by the separation of said sealing member and seat, the lubricant passing from said chamber between the separated sealing member and seat to and through said passage for delivery to a part to be lubricated.

4. The combination with a rotary shaft and a casing having a shaft opening through which said shaft extends, of means for sealing said shaft opening comprising a sealing member on said shaft, a sealing chamber in which said sealing member rotates and which is provided at one end with a seat against which said sealing member is adapted to seat to seal said shaft opening, a pressure actuated device in said sealing chamber arranged to act by its movement to separate said sealing member and said seat, means for supplying to the end of said sealing chamber at which said seat is located a lubricant under pressure which actuates said device to separate and hold said sealing member and seat out of contact in opposition to pressure tending to cause contact thereof and forms a liquid seal for said shaft opening, and an escape passage for the lubricant from said chamber which leads from said seat and which is closed when said sealing member is seated and is opened and allows the discharge of the lubricant from said sealing chamber for delivery to a part to be lubricated when said sealing member and seat are separated by said pressure actuated device.

WILLIS H. CARRIER.